US010732680B1

(12) United States Patent
Lu (10) Patent No.: US 10,732,680 B1
(45) Date of Patent: Aug. 4, 2020

(54) HARD DISK DRIVE CHASSIS AND HARD DISK DRIVE CHASSIS ASSEMBLY (71) Applicants: INVENTEC (PUDONG) TECHNOLOGY CORPORATION, Shanghai (CN); INVENTEC CORPORATION, Taipei (TW)

(72) Inventor: Xiaogang Lu, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 0 days.

(21) Appl. No.: 16/579,547

(22) Filed: Sep. 23, 2019

(30) Foreign Application Priority Data

Aug. 30, 2019 (CN) .......................... 2019 1 0815638

(51) Int. Cl.
*H05K 5/00* (2006.01)
*G06F 1/18* (2006.01)
*G11B 33/14* (2006.01)
*G11B 33/02* (2006.01)
*G11B 33/12* (2006.01)

(52) U.S. Cl.
CPC ............ *G06F 1/187* (2013.01); *G11B 33/027* (2013.01); *G11B 33/128* (2013.01); *G11B 33/1406* (2013.01)

(58) Field of Classification Search
CPC ........................................................ H05K 5/00
See application file for complete search history.

(56) References Cited

U.S. PATENT DOCUMENTS

2005/0152106 A1* 7/2005 Coster ..................... G06F 1/181
361/679.58
2009/0296338 A1* 12/2009 Peng ....................... G06F 1/187
361/679.31

* cited by examiner

*Primary Examiner* — Jerry Wu
(74) *Attorney, Agent, or Firm* — Maschoff Brennan (57) ABSTRACT

The disclosure provides a hard disk drive chassis including a main body, fasteners and an engagement component. The main body is configured to be installed on a tray. The main body has two support surfaces and fixing structures. The two support surfaces face a same direction and are configured to support a hard disk drive, and the fixing structures are respectively disposed on the two support surfaces. The fasteners are respectively configured to be disposed through the fixing structures so as to be fixed to the hard disk drive. The engagement component is pivotably disposed on the main body and pivotable between an engaged position and a released position. When the engagement component is in the engaged position, the engagement component is configured to be engaged with the tray.
When the engagement component is in the released position, the engagement component is configured to be disengaged from the tray.

8 Claims, 7 Drawing Sheets

HARD DISK DRIVE CHASSIS AND HARD DISK DRIVE CHASSIS ASSEMBLY

CROSS-REFERENCE TO RELATED APPLICATIONS

This non-provisional application claims priority under 35 U.S.C. § 119(a) on Patent Application No(s). 201910815638.3 filed in China on Aug. 30, 2019 the entire contents of which are hereby incorporated by reference.

BACKGROUND OF THE INVENTION

Technical Field of the Invention

The disclosure relates to a chassis and a chassis assembly, more particularly to a hard disk drive chassis and a hard disk drive chassis assembly.

Description of the Related Art

Generally, a server contains a plurality of hard disk drives to provide functions, such as data storage and data processing. The hard disk drives are respectively mounted on chasses that are together installed in a server tray. The conventional chassis for HDD has two side walls, and the hard disk drive is located between and fixed to the opposite side walls via screws.

SUMMARY OF THE INVENTION

One embodiment of the disclosure provides a hard disk drive chassis. The hard disk drive chassis is configured to support a hard disk drive and be installed on a tray. The hard disk drive chassis includes a main body, a plurality of fasteners and an engagement component. The main body is configured to be installed on the tray. The main body has two support surfaces and a plurality of fixing structures. The two support surfaces face a same direction and are configured to support the hard disk drive, and the fixing structures are respectively disposed on the two support surfaces. The fasteners are respectively configured to be disposed through the fixing structures so as to be fixed to the hard disk drive. The engagement component is pivotably disposed on the main body and pivotable between an engaged position and a released position. When the engagement component is in the engaged position, the engagement component is configured to be engaged with the tray. When the engagement component is in the released position, the engagement component is configured to be disengaged from the tray.

Another embodiment of the disclosure provides a hard disk drive chassis assembly configured to support a hard disk drive. The hard disk drive chassis assembly includes a tray, a main body, a plurality of fasteners and an engagement component. The tray includes a plate part and a plurality of fastening parts. Each of the plurality of fastening parts includes a narrow portion and a wide portion connected to each other. The narrow portions of the fastening parts are narrower than the wide portions of the fastening parts, ends of the narrow portions of the fastening parts respectively away from the wide portions of the fastening parts are connected the plate part, and the wide portions of the fastening parts are spaced apart from the plate part. The main body has two support surfaces, a plurality of fixing structures and a plurality of fastening structures. The two support surfaces face a same direction and configured to support the hard disk drive. The fixing structures are respectively disposed on the two support surfaces. The fastening structures are located between the two support surfaces, each of the fastening structures has a narrow portion and a wide portion connected to each other. The wider portions of the fastening structures are wider than the narrow portions of the fastening structures. The wide portions of the fastening parts are narrower than the wide portions of the fastening structures and wider than the narrow portions of the fastening structures. The narrow portions of the fastening parts are respectively and slidably located in the narrow portions of the fastening structures, and the main body is clamped by the wide portions of the fastening parts and the plate part. The fasteners are respectively configured to disposed through the fixing structures so as to be fixed to the hard disk drive. The engagement component is pivotably disposed on the main body and pivotable between an engaged position and a released position. When the engagement component is in the engaged position, the engagement component is engaged with the tray. When the engagement component is in the released position, the engagement component is disengaged from the tray.

BRIEF DESCRIPTION OF THE DRAWINGS

The present disclosure will become more fully understood from the detailed description given hereinbelow and the accompanying drawings which are given by way of illustration only and thus are not limitative to the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the figures, and some practical details are described in the following paragraphs, but the present disclosure is not limited thereto. Furthermore, for the purpose of illustration, some of the structures and components in the figures are simplified, and wires, reference lines or buses are omitted in some of the figures.

Moreover, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
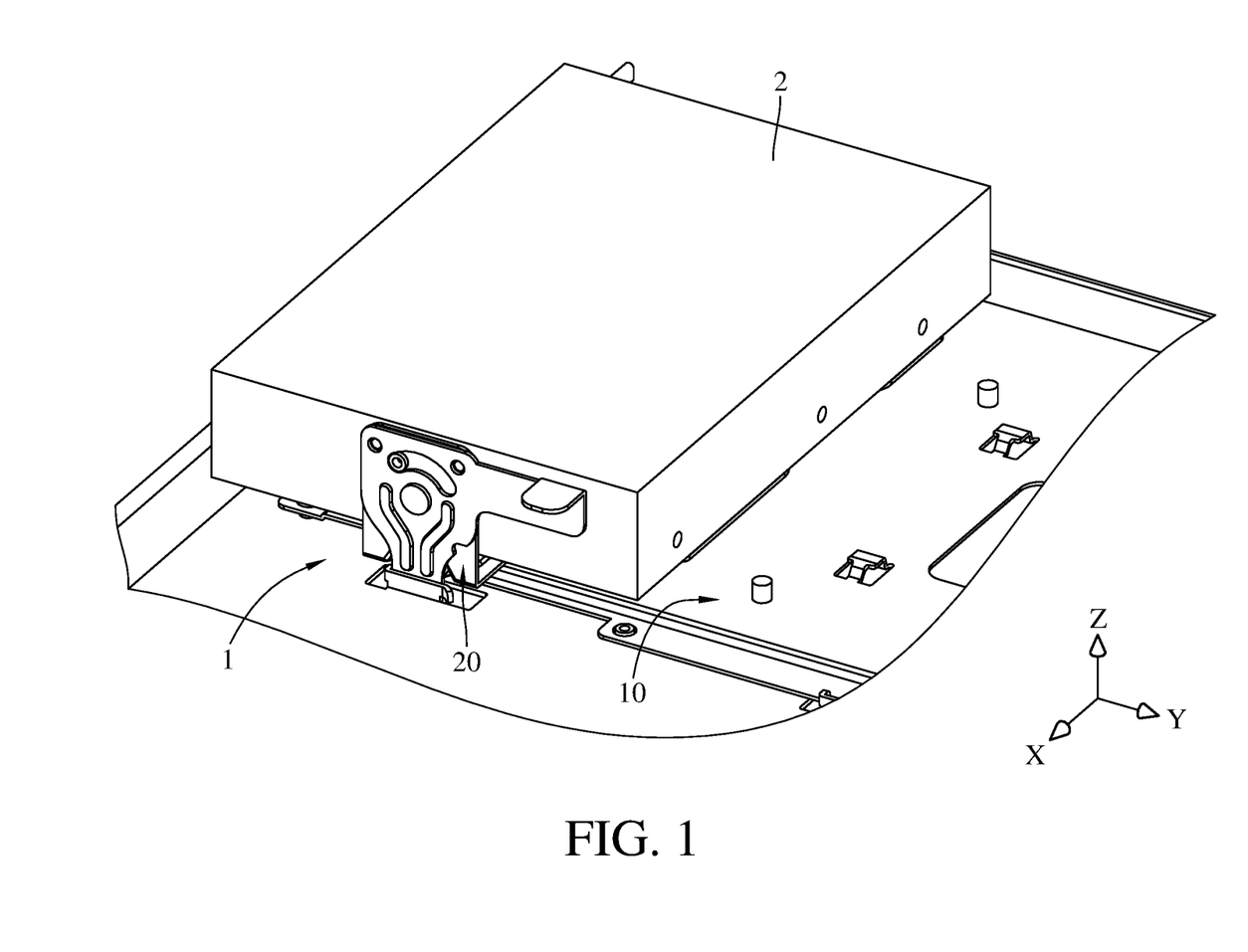
FIG. 1 is a partial perspective view of a hard disk drive chassis assembly according to one embodiment of the disclosure with a hard disk drive installed thereon.
Figure 2:
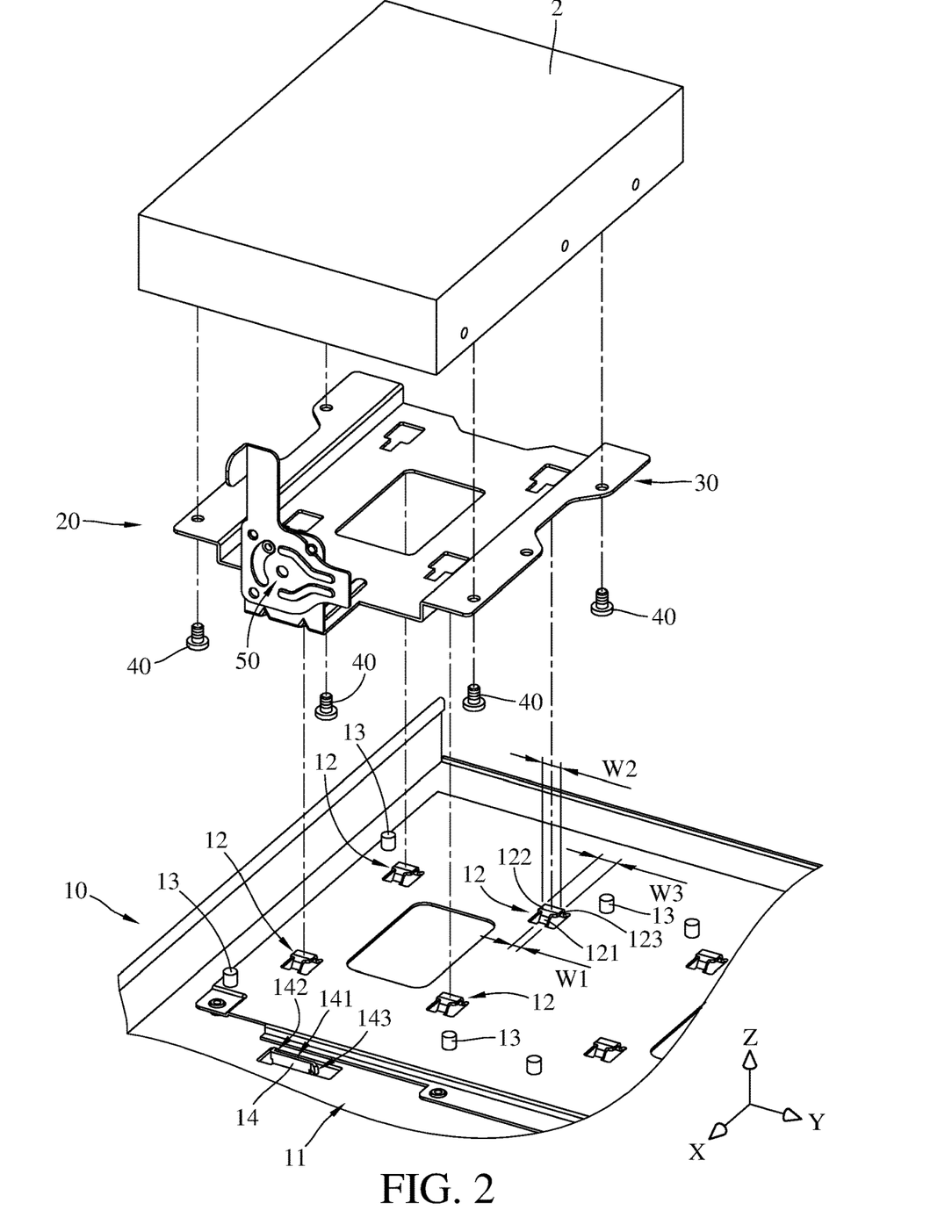
FIG. 2 is an exploded view of the hard disk drive and the hard disk drive chassis assembly in FIG. 1.

Referring to FIGS. 1 and 2, FIG. 1 is a partial perspective view of a hard disk drive chassis assembly 1 according to one embodiment of the disclosure with a hard disk drive 2 installed thereon, and FIG. 2 is an exploded view of the hard disk drive 2 and the hard disk drive chassis assembly 1 in FIG. 1.

In this embodiment, the hard disk drive chassis assembly 1 is configured to support the hard disk drive 2. The hard disk drive chassis assembly 1 includes a tray 10 and a hard disk drive chassis 20.

The tray 10 is, for example, a movable and plated-like component for support or holding other components on an electronic device, such as a server. In this embodiment, the tray 10 includes a plate part 11, a plurality of fastening parts 12, four positioning pillars 13 and at least one stopper 14. The fastening parts 12 are the same in structure. Each of the fastening parts 12 crosses two opposite sides of a hole of the plate part 11 and protrudes from the plate part 11. In more detail, each fastening part 12 includes a narrow portion 121, a wide portion 122 and an extension portion 123, the wide portion 122 is located between and connected to the narrow portion 121 and the extension portion 123, and the narrow portion 121 and the extension portion 123 are respectively connected to and inclined relative to the opposite sides of the hole of the plate part 11 so that the wide portion 122 is located above the plate part 11, and an end of the narrow portion 121 away from the wide portion 122 and an end of the extension portion 123 away from the wide portion 122 both are connected to the plate part 11. As shown in FIG. 2, the narrow portion 121 has a width W1, the wide portion 122 has a width W2, and the extension portion 123 has a width W3, where the width W1 is smaller than the width W2, and the width W2 is substantially equal to the width W3. The positioning pillars 13 are disposed on the plate part 11, and the fastening parts 12 are located within an area that the positioning pillars 13 forms. The stopper 14 is connected to the plate part 11, and the positioning pillars 13 and the fastening parts 12 are located at the same side of the stopper 14. The stopper 14 has a first stopping surface 141, a second stopping surface 142 and a guide surface 143. The first stopping surface 141 is located between and connected to the second stopping surface 142 and the guide surface 143. The first stopping surface 141, the second stopping surface 142 and the guide surface 143 respectively face three different directions; that is, the first stopping surface 141, the second stopping surface 142 and the guide surface 143 are not coplanar and not parallel to one another, where the first stopping surface 141 is, for example, approximately perpendicular to the second stopping surface 142.

Figure 3:
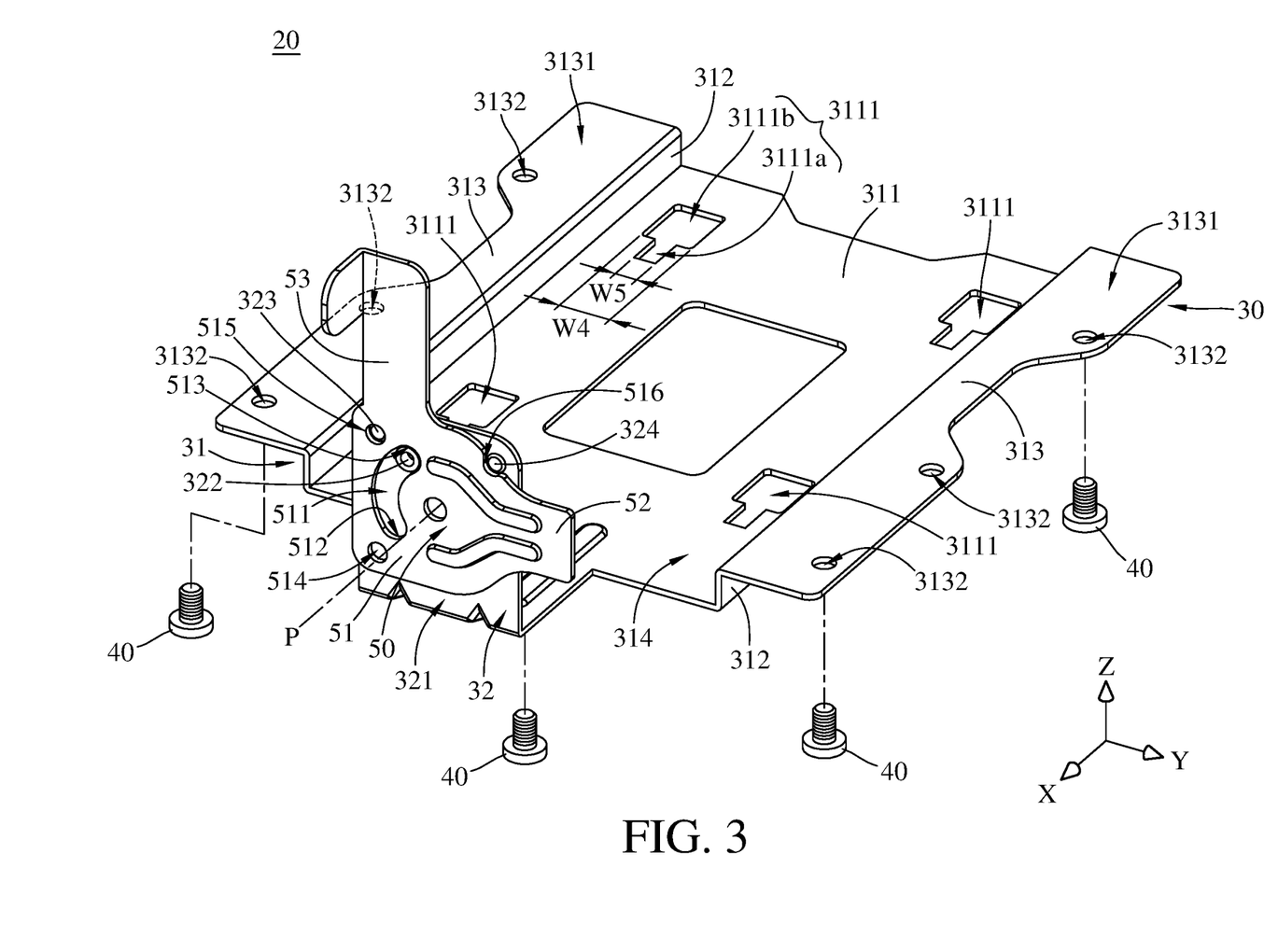
FIG. 3 is a perspective view of a hard disk drive chassis in FIG. 2.

Then, referring to FIGS. 1 to 3, where FIG. 3 is a perspective view of the hard disk drive chassis 20 in FIG. 2.

The hard disk drive chassis 20 includes a main body 30, a plurality of fasteners 40 and an engagement component 50.

The main body 30 includes a support plate part 31 and a stand plate part 32. The support plate part 31 includes a first plate portion 311, two second plate portions 312 and two third plate portions 313. The second plate portions 312 are connected to two opposite sides of the first plate portion 311, and the third plate portions 313 are respectively connected to two sides of the second plate portions 312 away from the first plate portion 311; that is, the third plate portions 313 are connected to the first plate portion 311 respectively via the second plate portions 312. The third plate portions 313 are substantially parallel to the first plate portion 311 and are spaced apart from the first plate portion 311, and the first plate portion 311 and the second plate portions 312 together form a heat dissipation space 314 therebetween. The stand plate part 32 is connected to the first plate portion 311, and the stand plate part 32 and the second plate portions 312 are respectively located at different sides of the first plate portion 311.

The first plate portion 311 has a plurality of fastening structures 3111. The fastening structures 3111 are the same in structure. Each of the fastening structure 3111 is, for example, a through hole. The fastening structure 3111 has a narrow portion 3111a and a wide portion 3111b connected to each other. The wide portion 3111b has a width W4, and the narrow portion 3111a has a width W5, where the width W4 is larger than the width W5, and the width W2 of the wide portion 122 is smaller than the width W4 and is larger than width W5, and the width W1 of the narrow portion 121 is smaller than the width W5.

Each of the third plate portions 313 has a support surface 3131. The support surfaces 3131 substantially face the same direction and are configured to support the hard disk drive 2, and the fastening structures 3111 are located between the two support surfaces 3131. When the hard disk drive 2 is placed on the support surfaces 3131, air is allowed to flow through the heat dissipation space 314, formed by the first plate portion 311 and the second plate portions 312, for cooling the hard disk drive 2.

Each of the third plate portions 313 has a plurality of fixing structures 3132 formed on the support surface 3131. The fixing structures 3132 are, for example, through holes. The fixing structures 3132 of each third plate portion 313 are arranged from a side of the third plate portion 313 close to the stand plate part 32 toward a side of the third plate portion 313 away from the stand plate part 32; that is, on each third plate portion 313, the fixing structures 3132 are spaced by different distances from the stand plate part 32. In this embodiment, the fixing structures 3132 respectively correspond to screw holes of the hard disk drive 2 in different sizes. For example, two of the fixing structures 3132 located closest to the stand plate part 32 and another two of fixing structures 3132 located farthest away from the stand plate part 32 are configured for the screw holes of a hard disk drive of 3.5-inch, and four of the fixing structures 3132 located away from the stand plate part 32 are configured for the screw holes of a hard disk drive of 2.5-inch. In this embodiment, the hard disk drive 2 is, for example, in 3.5 inches, and the fasteners 40 are respectively configured to penetrate through the corresponding fixing structures 3132 and to be screwed into the screw holes of the hard disk drive 2.

In this embodiment, the stand plate part 32 has an outer surface 321, a guide block 322 and two positioning protrusions 323 and 324. The outer surface 321 and the support surfaces 3131 respectively face different directions. In detail, the outer surface 321 faces toward a direction which is substantially perpendicular to that the support surfaces 3131 face toward. When the hard disk drive 2 is placed on the support surfaces 3131, the outer surface 321 faces away from the hard disk drive 2. The guide block 322 and the positioning protrusions 323 and 324 are disposed on the outer surface 321, and the positioning protrusion 323 is located closer to the guide block 322 than the positioning protrusion 324.

The engagement component 50 includes a mount portion 51, an engagement portion 52 and a handle portion 53. The engagement portion 52 and the handle portion 53 are respectively connected to two adjacent sides of the mount portion 51, and the mount portion 51 is pivotably disposed on the outer surface 321 of the stand plate part 32. The mount portion 51 has a groove 511, a first end surface 512, a second end surface 513, a first positioning hole 514, a second positioning hole 515 and a recess 516. The groove 511 is, for example, in a curved shape. The first end surface 512 and the second end surface 513 are located at two opposite ends of the groove 511. The guide block 322 of the stand plate part 32 is slidably located in the groove 511 of the mount portion 51. The first positioning hole 514 and the second positioning hole 515 are respectively located close to the first end surface 512 and the second end surface 513, and the first positioning hole 514 and the second positioning hole 515 are respectively located farther away from an axis P of the mount portion 51 than the first end surface 512 and the second end surface 513. The recess 516 is located closer to the engagement portion 52 than the groove 511, the first positioning hole 514 and the second positioning hole 515. In this embodiment, the engagement component 50 is pivotable between an engaged position and a released position.

For the purpose of illustration, a Cartesian coordinate system is provided. Define that a normal line of the outer surface 321 of the stand plate part 32 is substantially parallel to X-axis, and normal lines of the support surfaces 3131 are substantially parallel to Z-axis.

Figure 4:
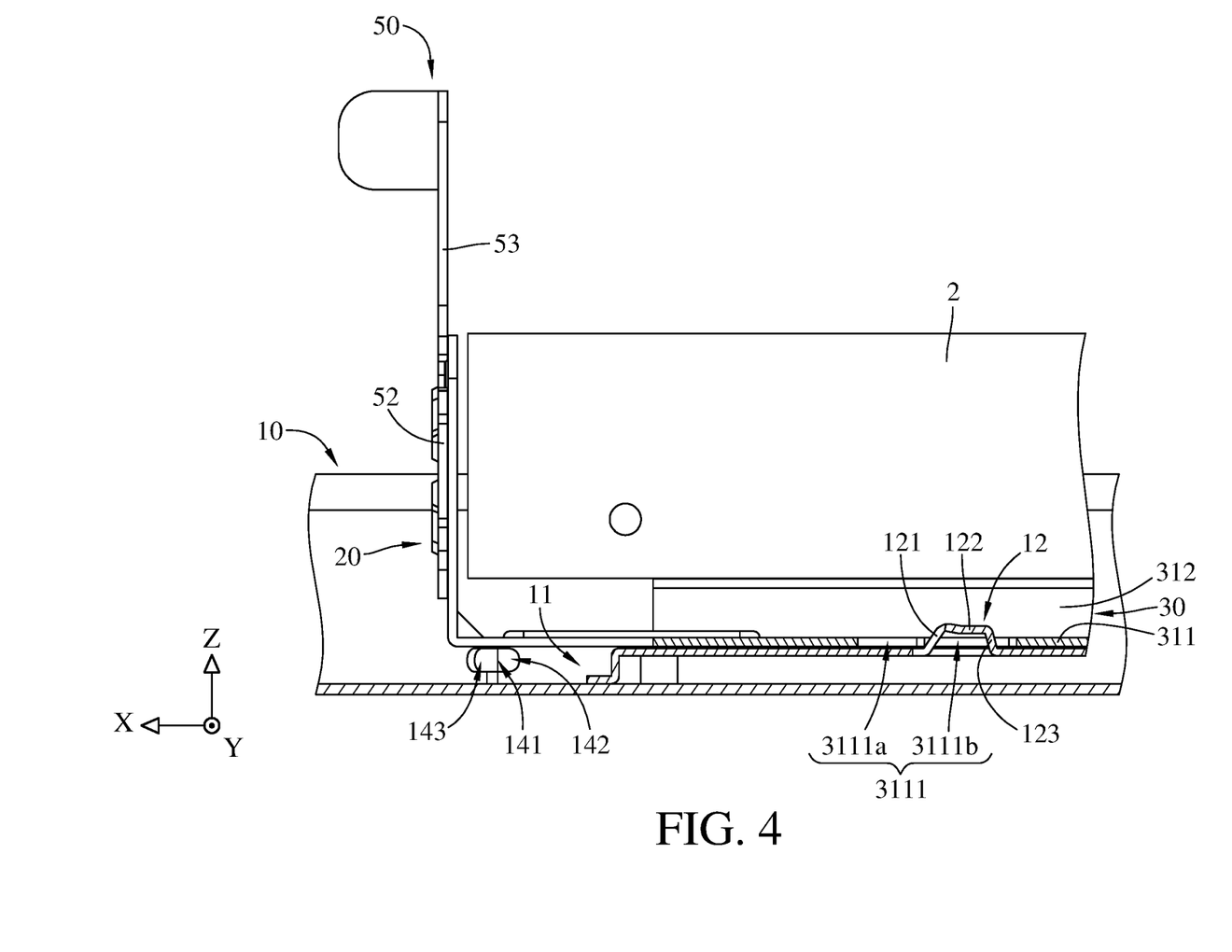
FIG. 4 is a partial cross-sectional view of the hard disk drive and the hard disk drive chassis assembly in FIG. 1, when wide portions of fastening parts respectively penetrate through wide portions of fastening structures.
Figure 5:
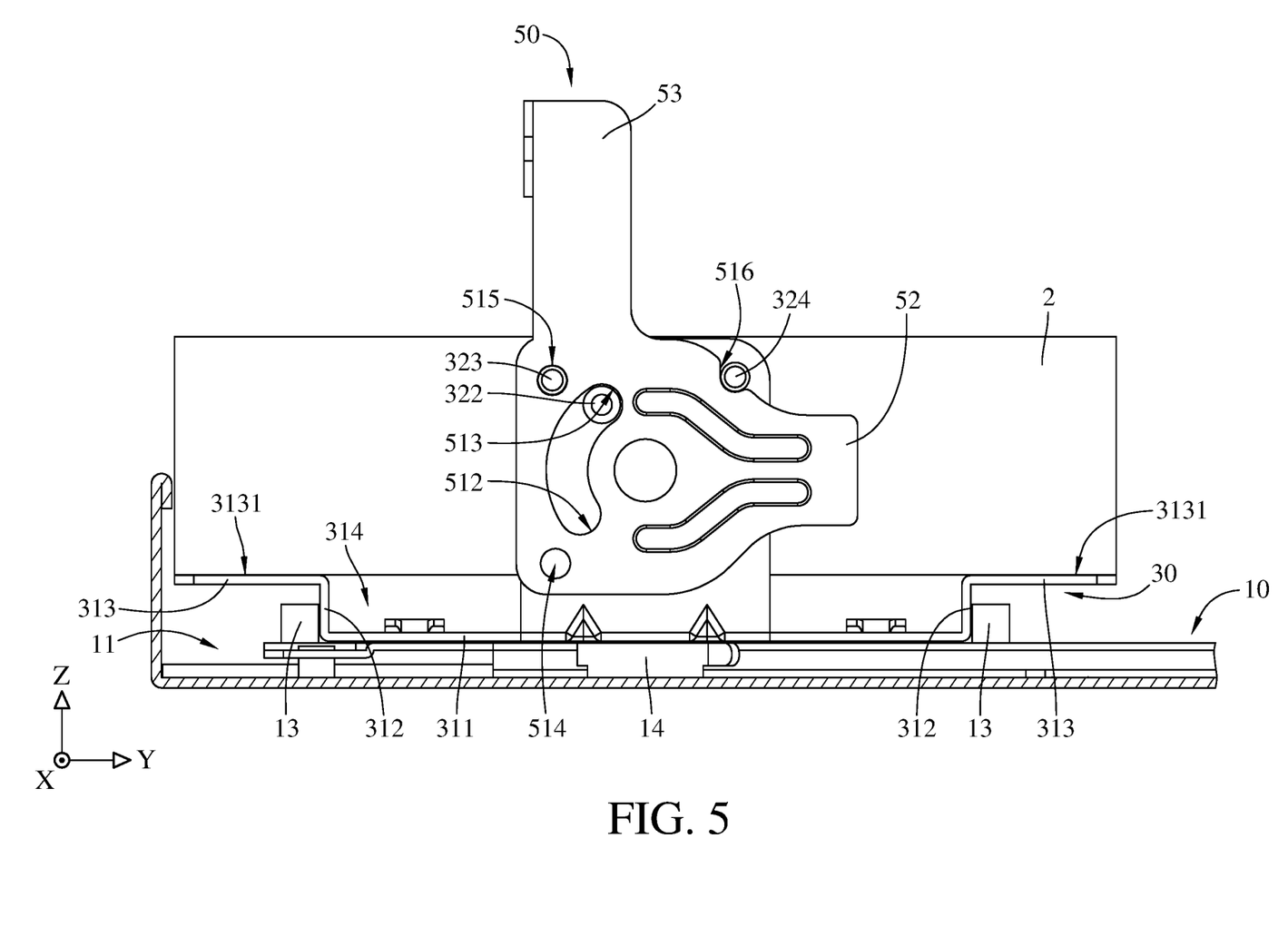
FIG. 5 is a front view of the hard disk drive and the hard disk drive chassis assembly in FIG. 4.

Then, referring to FIGS. 4 and 5 to illustrate how the hard disk drive 2 is installed on the tray 10, where FIG. 4 is a partial cross-sectional view of the hard disk drive 2 and the hard disk drive chassis assembly 1 in FIG. 1, and FIG. 5 is a front view of the hard disk drive 2 and the hard disk drive chassis assembly 20 in FIG. 4.

Firstly, the engagement component 50 is in the released position. At this moment, the guide block 322 is in contact with the second end surface 513, the positioning protrusions 323 and 324 are respectively located in the second positioning hole 515 and the recess 516. Then, the main body 30 is placed on the plate part 11 of the tray 10, and the wide portions 122 of the fastening parts 12 of the tray 10 respectively penetrate through the wide portions 3111b of the fastening structures 3111 of the first plate portion 311, and the positioning pillars 13 of the tray 10 are respectively in contact with sides of the second plate portions 312 facing away from the heat dissipation space 314. By doing so, the positioning pillars 13 limit the movements of the hard disk drive chassis 20 in the positive and negative Y-axis directions.

Figure 6:
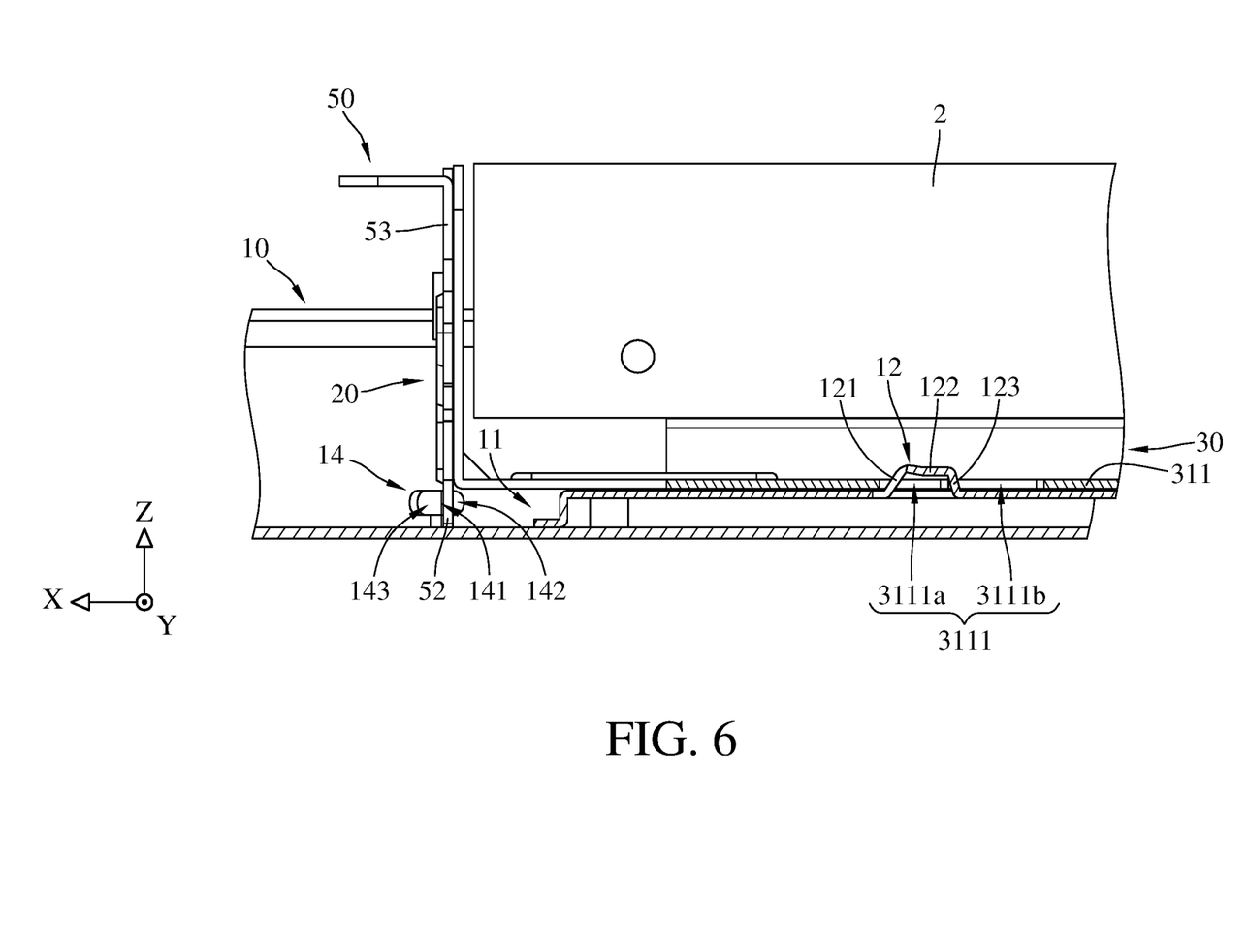
FIG. 6 is a partial cross-sectional view of the hard disk drive and the hard disk drive chassis assembly in FIG. 1, when a first plate portion is clamped by the wide portions of the fastening parts and a plate part.
Figure 7:
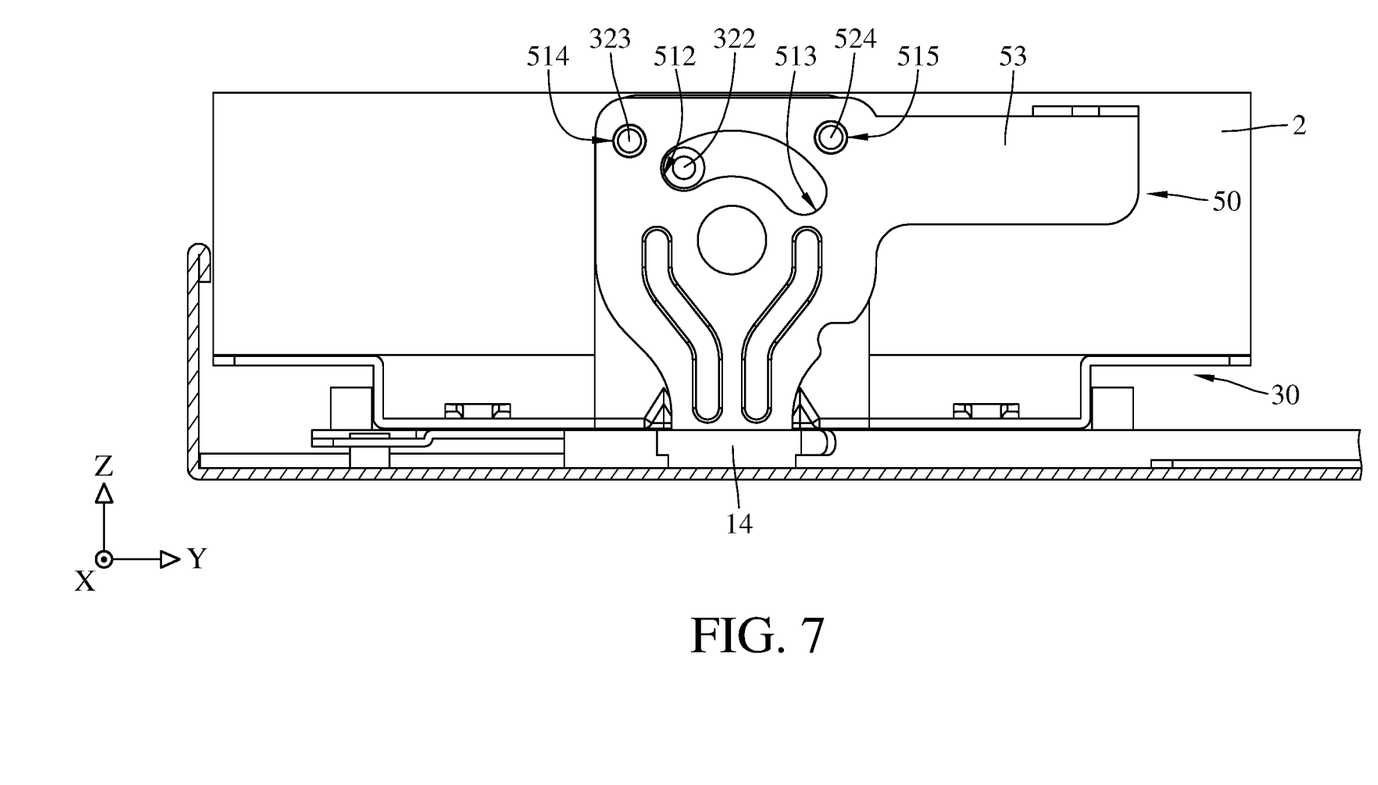
FIG. 7 is a front view of the hard disk drive and the hard disk drive chassis assembly in FIG. 6.

Then, referring to FIGS. 6 and 7, FIG. 6 is a partial cross-sectional view of the hard disk drive 2 and the hard disk drive chassis assembly 20 in FIG. 1, and FIG. 7 is a front view of the hard disk drive 2 and the hard disk drive chassis assembly 20 in FIG. 6.

The hard disk drive chassis 20 is moved along the negative X-axis direction, such that the narrow portions 121 of the fastening parts 12 of the tray 10 are respective moved to the narrow portions 3111a of the fastening structures 3111 of the first plate portion 311, and the extension portions 123 of the fastening parts 12 contact the first plate portion 311, such that the first plate portion 311 of the support plate part 31 is located between and clamped by the wide portions 122 of the fastening parts 12 and the plate part 11 of the tray 10.

By doing so, the wide portions of the fastening parts 12 and the plate part 11 of the tray 10 together limit the movements of the hard disk drive chassis 20 in the positive and negative Z-axis directions.

Then, the engagement component 50 is pivoted toward the engaged position by applying force on the handle portion 53. When the engagement component 50 reaches the engaged position, different sides of the engagement portion 52 of the engagement component 50 contact the first stopping surface 141 and the second stopping surface 142 of the stopper 14, the guide block 322 is moved to the first end surface 512, and the positioning protrusions 323 and 324 are respectively located at the first positioning hole 514 and the second positioning hole 515. By doing so, the extension portions 123 of the fastening parts 12 and the first stopping surface 141 of the stopper 14 together limit the movements of the hard disk drive chassis 20 in the positive and negative X-axis directions. As a result, the movements of hard disk drive chassis 20 in X, Y and Z axis are limited, such that the hard disk drive chassis 20 is firmly engaged with and installed on the tray 10.

In this embodiment, when the engagement component 50 is pivoted toward the engaged position under a condition that the hard disk drive chassis 20 has been moved along the X-direction but not contact the extension portions 123 of the fastening parts 12, the engagement portion 52 of the engagement component 50 will contact the guide surface 143 of the stopper 14, such that the entire hard disk drive chassis 20 can be guided and moved in position along the negative X-axis direction. As such, it ensures that the engagement portion 52 of the engagement component 50 is in contact with the first stopping surface 141 and the second stopping surface 142 after the engagement component 50 is moved to the engaged position.

Then, performing the following steps can detach the hard disk drive chassis 20 from the tray 10: firstly, to pivot the engagement component 50 from the engaged position back to the released position so as to disengage the engagement portion 52 of the engagement component 50 from the stopper 140 of the tray 10; secondly, to move the hard disk drive chassis 20 along the positive X-axis direction so as to move the wide portions 122 of the fastening parts 12 of the tray 10 to the wide portions 3111b of the fastening structures 3111 of the first plate portion 311. By doing so, the hard disk drive chassis 20 is allowed to be detached from the tray 10 along the positive Z-axis direction.

In this embodiment, the support surfaces 3131 face the same direction, such that the support surfaces 3131 together support the bottom side of the hard disk drive 2 rather than two opposite lateral sides of the hard disk drive 2. Therefore, the hard disk drive chassis 20 does not require any lateral wall to support the lateral sides of the hard disk drive 2, such that the room between two adjacent hard disk drive chasses 20 is sufficient and thus allowing cables to be easily arranged.

In addition, the cooperation of the groove 511 and the guide block 322 can limit the movement range of the engagement component 50 so as to prevent the engagement component 50 from being overly pivoted. In this embodiment, the stand plate part 32 has the guide block 322, and the mount portion 51 of the engagement component 50 has the groove 511, but the present disclosure is not limited thereto; in some other embodiments, the stand plate part may have the groove, and the mount portion of the engagement component may have the guide block; in another embodiment, the stand plate part may have no guide block, and the mount portion of the engagement component may have no groove.

Moreover, the second stopping surface 142 is able to stop the engagement component 50 at the engaged position, which ensures that the engagement component 50 is positioned in the engaged position.

Furthermore, the cooperation of the positioning protrusions 323 and 324, the first positioning hole 514, the second positioning hole 515 and the recess 516 helps the engagement component 50 to be positioned in the engaged position or in the released position, such that the possibility of unexpected movement of the engagement component 50 can be reduced.

In this embodiment, the positioning protrusion 324 can enter into the recess 516 when the engagement component 50 is pivoted from the engaged position to released position, such the protrusion is prevented from interfering with the mount portion 51.

In this embodiment, the quantity of the positioning protrusions 323 and 324 is not restricted to be two; in some other embodiments, the stand plate part 32 may have only one positioning protrusion. For example, the stand plate part may mere have the positioning protrusion 323 shown in FIG. 4. And, in such a case, the recess of the mount portion of engagement component may be omitted.

The positions of the first positioning hole 514 and the second positioning hole 515 is not restricted; in some other embodiments, the first end surface and the second end surface of the groove may be located farther away from the axis of the mount portion than the first positioning hole and the second positioning hole.

In addition, each fastening part 12 of the tray 10 has the extension portion 123, but the present disclosure is not limited thereto; in some other embodiments, each fastening part of the tray may have no extension portion.

According to the hard disk drive chassis and the hard disk drive chassis assembly as discussed above, the support surfaces face the same direction, such that the support surfaces together support the bottom side of the hard disk drive rather than two opposite lateral sides of the hard disk drive. Therefore, the hard disk drive chassis does not require any lateral wall to support the lateral sides of the hard disk drive, such that the room between two adjacent hard disk drive chassis is sufficient and thus allowing cables to be easily arranged.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A hard disk drive chassis, configured to support a hard disk drive and be installed on a tray, comprising: a main body, configured to be installed on the tray, wherein the main body has two support surfaces and a plurality of fixing structures, the two support surfaces face a same direction and are configured to support the hard disk drive, and the plurality of fixing structures are respectively disposed on the two support surfaces; a plurality of fasteners, respectively configured to be disposed through the plurality of fixing structures so as to be fixed to the hard disk drive; and an engagement component, pivotably disposed on the main body and pivotable between an engaged position and a released position; wherein when the engagement component is in the engaged position, the engagement component is configured to be engaged with the tray; when the engagement component is in the released position, the engagement component is configured to be disengaged from the tray; and the main body comprises a support plate part and a stand plate part connected to each other, the two support surfaces are located on the support plate part, the stand plate part has an outer surface, the outer surface and the two support surfaces respectively face different directions, the outer surface is configured to face away from the hard disk drive, and the engagement component is pivotably disposed on the outer surface of the stand plate part; the engagement component has a groove, a first end surface and a second end surface, the groove is in a curved shape, the first end surface and the second end surface are respectively located at two opposite ends of the groove, the stand plate part has a guide block, the guide block is slidably located in the groove; when the engagement component is in the engaged position, the guide block is in contact with the first end surface; when the engagement component is in the released position, the guide block is in contact with the second end surface.

2. The hard disk drive chassis according to claim 1, wherein the stand plate part further has at least one positioning protrusion, the engagement component has a first positioning hole and a second positioning hole; when the engagement component is in the engaged position, the at least one positioning protrusion is located in the first positioning hole; when the engagement component is in the released position, the at least one positioning protrusion is located in the second positioning hole.

3. The hard disk drive chassis according to claim 2, wherein the quantity of the at least one positioning protrusion is two, the engagement component further has a recess; when the engagement component is in the engaged position, the two positioning protrusions are respectively located in the first positioning hole and the second positioning hole; when the engagement component is in the released position, the two positioning protrusions are respectively located in the second positioning hole and the recess.

4. The hard disk drive chassis according to claim 1, wherein the support plate part comprises a first plate portion, two second plate portions and two third plate portions, the two second plate portions are connected to two opposite sides of the first plate portion, the two third plate portions are respectively connected to two sides of the two second plate portions away from the first plate portion, the two third plate portion and are substantially parallel to the first plate portion and spaced apart from the first plate portion, the two support surfaces are respectively located on the two third plate portions, the stand plate part is connected to the first plate portion, the first plate portion and the two second plate portions form a heat dissipation space there between, and two sides of the two second plate portions facing away from the heat dissipation space are respectively configured to be in contact with a plurality of positioning pillars of the tray.

5. The hard disk drive chassis according to claim 4, wherein the first plate portion has a plurality of fastening structures, each of the plurality of fastening structures has a narrow portion and a wide portion which is connected to and wider than the narrow portion.

6. The hard disk drive chassis according to claim 1, wherein the engagement component comprises a mount portion, an engagement portion and a handle portion, the engagement portion and the handle portion are respectively connected to two adjacent sides of the mount portion, the mount portion is pivotably disposed on the main body; when the engagement component is in the engaged position, the engagement portion is configured to be engaged with the tray; when the engagement component is in the released position, the engagement portion is configured to be disengaged from the tray.

7. A hard disk drive chassis assembly, configured to support a hard disk drive, comprises: a tray, comprising a plate part and a plurality of fastening parts, wherein each of the plurality of fastening parts comprises a narrow portion and a wide portion connected to each other, the narrow portions of the plurality of fastening parts are narrower than the wide portions of the plurality of fastening parts, ends of the narrow portions of the plurality of fastening parts respectively away from the wide portions of the plurality of fastening parts are connected the plate part, and the wide portions of the plurality of fastening parts are spaced apart from the plate part; a main body, having two support surfaces, a plurality of fixing structures and a plurality of fastening structures, the two support surfaces face a same direction and configured to support the hard disk drive, the plurality of fixing structures are respectively disposed on the two support surfaces, the plurality of fastening structures are located between the two support surfaces, each of the plurality of fastening structures has a narrow portion and a wide portion connected to each other, the wider portions of the plurality of fastening structures are wider than the narrow portions of the plurality of fastening structures, the wide portions of the plurality of fastening parts are narrower than the wide portions of the plurality of fastening structures and wider than the narrow portions of the plurality of fastening structures, the narrow portions of the plurality of fastening parts are respectively and slidably located in the narrow portions of the plurality of fastening structures, and the main body is clamped by the wide portions of the plurality of fastening parts and the plate part; a plurality of fasteners, respectively configured to disposed through the plurality of fixing structures so as to be fixed to the hard disk drive; the main body comprises a support plate part and a stand plate part connected to each other, the two support surfaces are located on the support plate part, the stand plate part has an outer surface, the outer surface and the two support surfaces respectively face different directions, the outer surface is configured to face away from the hard disk drive, and an engagement component, pivotably disposed on the outer surface of the stand plate part and pivotable between an engaged position and a released position; wherein when the engagement component is in the engaged position, the engagement component is engaged with the tray; when the engagement component is in the released position, the engagement component is disengaged from the tray.

8. The hard disk drive chassis assembly according to claim 7, wherein the main body comprises a support plate part and a stand plate part, the support plate part comprises a first plate portion, two second plate portions and two third plate portions, the two second plate portions are respectively connected to two opposite sides of the first plate portion, the two third plate portions are respectively connected to two sides of the two second plate portions away from the first plate portion, the two third plate portions are parallel to the first plate portion and spaced apart from the first plate portion, the two support surfaces are respectively located on the third plate portions, the plurality of the fastening structures are located on the first plate portion, the stand plate part is connected to the first plate portion, the first plate portion and the two second plate portions form a heat dissipation space therebetween, the tray further comprises a plurality of positioning pillars and a stopper, the plurality of the positioning pillars are disposed on the plate part, the stopper is connected to the plate part, two sides of the two second plate portions respectively facing away from the heat dissipation space are respectively in contact with the plurality of positioning pillars; when the engagement component is in the engaged position, the engagement component is engaged with the stopper; when the engagement component is in the released position, the engagement component is disengaged from the stopper.

* * * * *